Feb. 13, 1934.  W. E. MOBERLEY  1,946,753
TOOL
Filed Nov. 26, 1930
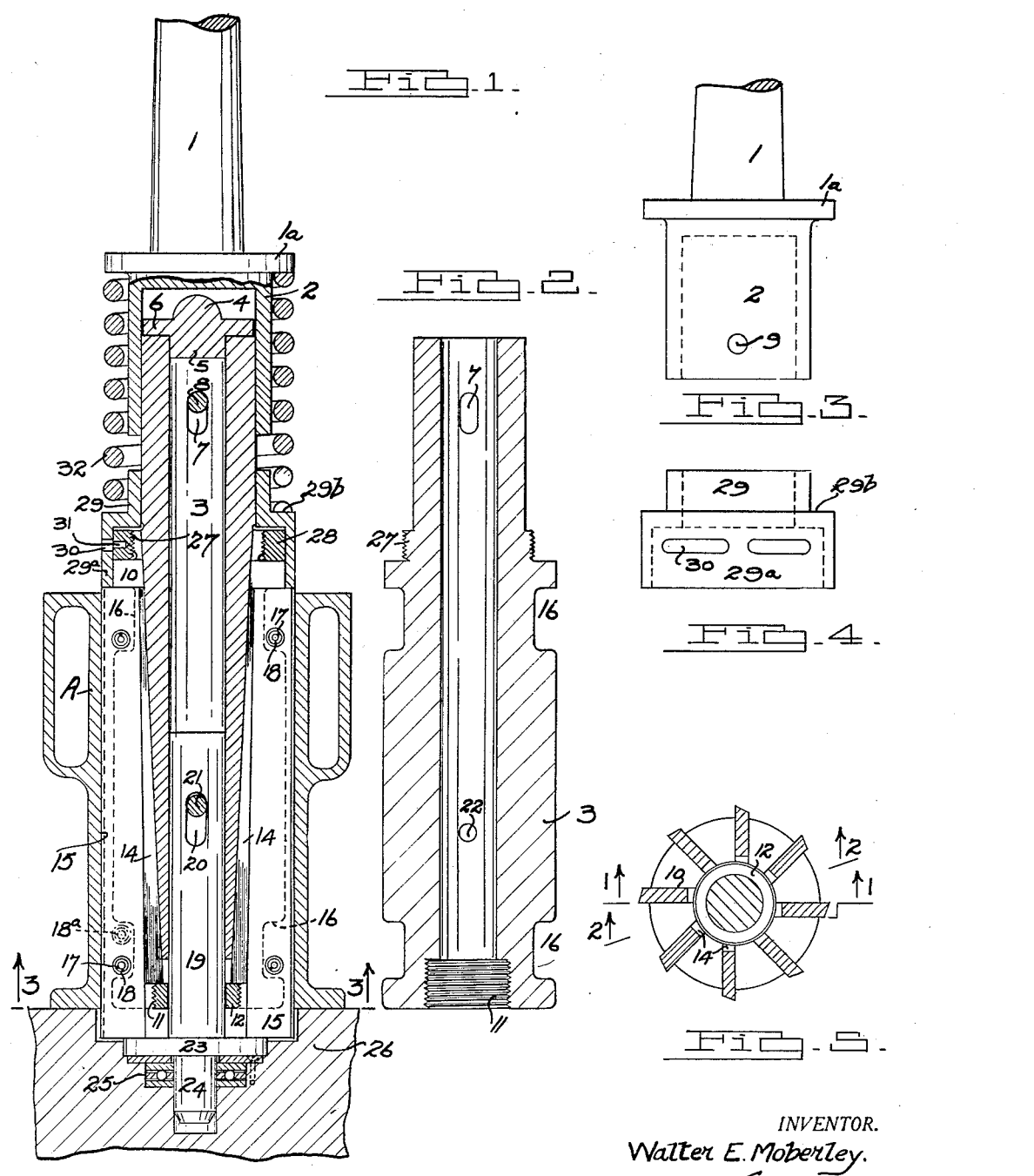
INVENTOR.
Walter E. Moberley.
BY
Grant Baldwin
ATTORNEY.

Patented Feb. 13, 1934

1,946,753

UNITED STATES PATENT OFFICE 1,946,753

TOOL

Walter E. Moberley, Detroit, Mich.

Application November 26, 1930
Serial No. 498,411

4 Claims. (Cl. 77—58)

This invention relates to improvements in tools, and refers more particularly to sizing and surfacing tools. It is an object of the invention to provide a tool for sizing and surfacing cylinders and the like which is intended to be fed downwardly until it extends through the whole length of the cylinder to be worked upon, to provide means for then moving cutting blades in the tool outwardly so that the whole length of the bore is operated on simultaneously, and to provide means for moving the blades inwardly again when the feed of the tool is tripped and as withdrawal of the tool from the cylinder commences.

Another object of the invention is to provide such a tool having means for moving the cutting blades radially outwards during the final portion on the downward movement of the holder, so that the blades rotate at right angles to the axis of the work while cutting although their rotating holder continues to feed downwardly through the work.

Other objects of the invention are to provide such a tool: wherein means are provided for setting the blades so that when moved to their outward limit they will cut a hole of the desired diameter after being reground, so that a large number of regrinds on the blades may be had; and wherein provision is made for continued feed of the upper end of the holder, if the feed stop is not quite accurately set, after the cutting blades have reached their outward cutting position, without moving the latter or the lower portion of the holder any further downwards through the work.

With these and other objects and advantages in view which will become apparent as the specification proceeds, the invention is hereinafter more fully described with the aid of the accompanying drawing, in which:

Figure 1 illustrates a longitudinal section of the tool on the line 1—1 of Figure 3.

Figure 2 is a section of the body of the holder on the line 2—2 of Figure 3.

Figure 3 is a section on the line 3—3 of Figure 1.

Figures 4 and 5 are side elevations of the sliding collar and shank respectively.

Referring to the drawing, 1 designates a tool shank which fits into a spindle (not shown) of a machine in which my tool is to be employed. At the lower extremity of the shank 1 and concentric with the latter is a sleeve 2 open at its lower extremity. Mounted in the sleeve 2 is the upper end of a body 3 the outside diameter of which is preferably very slightly smaller than the bore of the sleeve 2 adjacent but spaced from the closed upper extremity of which a semi-spherical aligning element 4 normally rests which has a projection 5 on its underside which fits snugly into the upper end of the body 3 which is tubular for its entire length. Between the element 4 and the projection 5 and integral with both is a flange 6 which is smaller in diameter than the bore of the sleeve portion 2 and has its underside resting upon the upper extremity of the body. Thus, within close limits, the body 3 is permitted to float relative to the shank 1. Through the body 3 a longitudinal slot 7 is formed through which a pin 8 passes, and the latter is a tight fit in openings 9 formed through opposite sides of the sleeve portion 2, thereby permitting limited longitudinal movement of the body 3 relative to the shank 1.

A plurality of outwardly and upwardly tapered radial slots 10 are formed in the periphery of the body 3 from its lower extremity; and the lower end of the tubular body 3 is bored out a larger diameter and internally threaded as shown at 11 to receive an annular nut 12. In the bottoms of the slots 10 wedges 14 are provided the inner sides of which are inclined longitudinally to conform to the taper of the slot bottoms against which they rest, and their outer faces are also upwardly and outwardly inclined though to a lesser extent than their inner sides. Cutting blades 15 are mounted in the slots 10 with their inner sides resting against the outer sides of the wedges 14; these blades of course project beyond their slots outwardly, and are longer than the wedges 14. The lower ends of the wedges 14 rest on the nut 12, and the former are shorter than the slots 10 so that by movement of the said nut the wedges may be raised thereby moving the blades 15 outwardly. Two annular recesses 16 are formed around the body 3. Through the blades 15 apertures 17 are formed for the passage of helical springs 18 which encircle the tool and are suitably joined at their extremities. These springs 18 hold the inner sides of the blades 15 against the wedges 14, and the latter against the bottoms of their slots 10.

Longitudinally movable in the bore of the lower portion of the body 3 is a pilot 19 having a longitudinal slot 20 therethrough intermediately of its length through which a pin 21 extends which is supported in openings 22 formed through opposite sides of the body 3 thereby permitting longitudinal movement of the pilot 19 in the said body. Integral with the pilot 19 at its lower extremity is a flange 23 which rests against the undersides of the blades 15, and extending downwardly from the said flange is a guide 24 which is movable longitudinally through a suitable bearing 25 provided in the work table 26.

The blades 15 project below the body 3 and are held in that position by spring tension in a manner hereinafter described. When the pilot 19 and flange 23 are lowered so that the latter rests against the top of the work table 26 continued downward movement of the flange becomes impossible. Then the latter holds the blades 15 against further downward movement so that continued movement in that direction of the body 3 and wedges 14 forces the blades 15 upwardly relative to the body and thus outwardly.

Around the body an externally threaded portion 27 is provided towards its upper end through which the upper extremities of the slots 10 extend. 28 denotes an annular nut in threaded engagement with the threaded portion 27. A sliding collar 29 is arranged around the body 3 above the nut 28, and has a lower annularly enlarged portion 29a which encircles the said nut. The underside of the said enlarged portion 29a rests against the upper extremities of the blades 15. Through the periphery of the enlarged portion 29a circumferential slots 30 are formed to afford access to radial apertures 31 in the nut 28 so that the latter may be readily rotated, since this nut limits the upward movement of the blades 15 in their slots 10.

Between a flange 1a which extends outwardly around the shank 1 and a shoulder 29b formed at the upper end of the enlarged portion 29a of the sliding collar a helical spring 32 is arranged, so that as the blades 15 are moved upwardly relative to the body 3 the spring becomes gradually more compressed until the blades 15 strike the nut 28; then, if the downward movement of the tool is continued, further compression is exerted on the spring 32 by downward movement of the shank 1 and sleeve 2 relative to the body 3, which is permitted by downward movement of the pin 8 in the body slot 7, until the closed upper end of the sleeve 2 strikes the top of the element 4. The semi-spherical form of the latter is only of use when the latter occurs, and eliminates any tendency for the body 3 to turn relative to the shank 1. It will also be noted that the spring 32 must be sufficiently strong to carry the feed of the blades 15 as they are gradually moved upwardly in their slots 10.

It is believed that the operation of the tool will be readily understood from the foregoing description, briefly it is as follows: The tension of the spring 32 normally holds the pin 8 at the upper end of the body slot 7 so that the element 4 is spaced from the closed upper end of the sleeve 2, and also holds the blades 15 downwardly relative to the body 3 through the lower extremity of the annular portion 29a of the sliding collar 29 which then projects below the nut 28. Rotation of the shank 1 is transmitted to the body 3 through the pin 8. When the blades 15 are in their downward position relative to the body 3 the pilot 19 is also in its downward position so that the pin 21 is resting against the top of the pilot slot 20. In Figure 1 the pin 21 is shown just after the flange 23 has contacted the top of the work table 26 and consequently the flange has commenced to move the blades 15 upwardly, and therefore outwardly, relative to the body 3. During the upward movement of the blades 15 relative to the body 3 the springs 18 move upwardly in their recesses 16 to the position indicated at 18a. The wedges 14 do not move in their slots 10 but remain with their lower extremities against the nut 12. Firstly, because the taper on the inner sides of the wedges is steeper than on their outer sides, and secondly, because the inner sides of the blades are of a smoother finish than either the sides of the wedges or the bases of the slots 10. By adjusting the position of the nut 28 the top outward positions of the blades 15 is varied; and, as previously stated, adjustment of the nut 12 moves the wedges longitudinally, so that adjustment may be made after the blades have been reground.

After the blades 15 have contacted the nut 28 any continued downward feed of the machine spindle moves the shank 1 downwardly relative to the body 3 as permitted by the slot 7 and pin 8. When the tool starts to move upwardly again the spring 32 returns the pin 8 to the top of the slot 7 and moves the blades 15 downwardly, and also inwardly due to the tension of the springs 18, until the pilot 19 moves sufficiently for the pin 21 to contact the top of the slot 20.

A denotes a cylinder which is being sized and surfaced by the blades 15 from which it may be seen that the latter are longer than the cylinder so that the whole length of the bore is operated on simultaneously.

While in the foregoing the preferred embodiment of the invention has been described and shown, it is understood that the construction is susceptible to such alterations and modifications as fall within the scope of the appended claims.

What I claim is:

1. A tool of the character described comprising a body adapted to be moved axially and having substantially longitudinal slots in its periphery, blades seating in said slots and projecting outwardly therefrom, said blades having cutting edges formed along their outer margins, the bases of both the slots and the blades being longitudinally inclined so that as the blades are moved longitudinally in the slots the radial distance of their cutting edges from the body axis varies, a pilot movable longitudinally in one extremity of said body, a flange on said pilot against which one end of each blade rests, a sliding collar around said body one extremity of which rests against the end of each blade remote from said flange, spring means tending to move said collar and blades and through the latter to move said flange away from said body, means limiting the distance the flange may be moved from said body, and means for preventing longitudinal movement of said flange with said body after the latter has been moved axially a predetermined distance in one direction so that the adjacent extremity of the body moves nearer to said flange thereby moving said blades longitudinally and outwardly in their slots to bore work to a predetermined size, said spring means returning said blades longitudinally when said body commences to travel axially in the opposite direction, and means for maintaining said blades in seated position in their slots at all times so that as said blades are returned to their initial position their cutting surfaces are moved away from the bore of the work.

2. In a tool of the character described, the combination of a body having substantially longitudinal slots therein, cutting blades mounted in said slots and projecting therefrom, the bases of both the slots and the blades being longitudinally inclined so that as the blades are moved longitudinally in the slots the radial distance of their cutting edges from the body axis varies, a sliding collar around said body, one extremity of which rests on one end of said blades, a flange adjacent one end of said body, a spring extending between said flange and said collar tending to move said collar and blades in one direction, a pilot movable axially in the other end of said body, means limiting said axial movement, and another flange on said pilot against which the extremities of the blades remote from the sliding collar rest.

3. A tool comprising a body having substantially longitudinal slots formed therein, blades seated in said slots and projecting therefrom, the bases of both the slots and the blades being longitudinally inclined so that as the blades are moved longitudinally in their slots the radial distance of their cutting edges from the body axis varies, cutting edges formed along the outer margins of said blades, a pilot movable longitudinally relative to said body, means on said pilot for contacting one extremity of each blade and moving said blades longitudinally and outwardly of said body, a shank movable longitudinally on the other extremity of said body, an annular enlargement on said shank, a spring around said body one extremity of which rests against said annular enlargement and the opposite end of which exerts pressure against the ends of the blades remote from the pilot, so that movement of the latter in one direction relative to the body by which the blades are moved outwardly compresses said spring, said spring tending to return said blades and move said pilot in the opposite direction, and means holding said blades seated in their slots at all times.

4. A tool of the character described comprising a body adapted to be fed axially and having substantially longitudinal slots formed therein the bases of said slots being flat throughout their entire length but inclined to the axis of the body, blades longitudinally slidable in said slots, the bases of said blades resting on the slot bases, one extremity of each blade projecting beyond said body, one end of said body being axially apertured, a pilot axially movable in said aperture, a flange on said pilot resting against the extremities of the blades so that when the pilot is moved further into the aperture the blades are moved in their slots, and, due to the inclination of the slot bases, the blades are then moved axially outward, and a collar resiliently mounted around said body resting against the extremities of the blades remote from the flange tending to return the blades to their initial positions in their slots, said blades then moving the flange and pilot to their initial positions.

WALTER E. MOBERLEY.